United States Patent [19]

Halpern et al.

[11] 4,403,331
[45] Sep. 6, 1983

[54] METHOD AND APPARATUS FOR TRANSMITTING DATA OVER LIMITED BANDWIDTH CHANNELS

[75] Inventors: Peter H. Halpern, Longwood; Peter E. Mallory, Edgewater, both of Fla.

[73] Assignee: Microdyne Corporation, Ocala, Fla.

[21] Appl. No.: 259,442

[22] Filed: May 1, 1981

[51] Int. Cl.³ .......................................... H03K 13/11
[52] U.S. Cl. .................................... 375/37; 371/2; 370/21
[58] Field of Search ................ 375/18, 37, 38, 39, 375/42, 53; 371/2; 370/19, 20, 21; 179/15.55 R

[56] References Cited

U.S. PATENT DOCUMENTS

| | | | |
|---|---|---|---|
| 3,377,625 | 4/1968 | Filipowsky | 375/37 |
| 3,384,715 | 5/1968 | Higuchi et al. | 370/21 |
| 3,882,485 | 5/1975 | Bluestein et al. | 375/18 |
| 4,327,439 | 4/1982 | Gockler et al. | 375/39 |

*Primary Examiner*—Benedict V. Safourek
*Assistant Examiner*—Stephen Chin
*Attorney, Agent, or Firm*—Duckworth, Allen, Dyer & Pettis

[57] ABSTRACT

A method of developing waveforms having the energy therein concentrated within a limited bandwidth and modems for generating, transmitting, and receiving digital data utilizing such waveforms as carriers. A set of mutually orthogonal basis signals are selected to maximize their energies within the channel, each is binary coded and stored in the modem. A set of optimized coefficients is stored and utilized to weight each basis function in a coding arrangement to define bytes of digital data. The coded and weighted basis functions for each successive byte are summed to form a composite signal and transmitted over the channel as an analog waveform. Stored basis signals at the receiving end are correlated with the received waveform to thereby extract the coefficients which are decoded to reproduce the transmitted bytes. Both coding gain and reduction of intersymbol interference is achieved.

17 Claims, 10 Drawing Figures

METHOD AND APPARATUS FOR TRANSMITTING DATA OVER LIMITED BANDWIDTH CHANNELS

BACKGROUND OF THE INVENTION

1. Field of the Invention

The present invention relates to methods and modems for transmitting digital data and more particularly to the method of generating signals having concentrated spectral occupancy of the channel bandwidth and coding gain and to voice channel modems utilizing such signals.

2. Description of the Prior Art

The wide use of digital signals often requires transmission of digital data over narrow band communication channels, such as voice grade telephone line. A typical usable bandwidth is therefore in the range of 700 Hz to 2700 Hz. Similarly, voice bandwidth channels transmitted over microwave and satellite links may be required to carry digital data. A number of well known techniques are commonly used for transmission of digital signals over restricted bandwidth channels. Typically, systems will utilize a carrier which may be modulated by on/off keying, by frequency shift keying or by phase shift keying. At the receiving end, a decision is made as to which level of a binary signal was transmitted. The detectability of the received signal is determined by relative magnitude of the difference signal: that is, the energy in the signal representing the difference between a ZERO and a ONE. Assuming that the energy per symbol is fixed at the transmitting end, increasing the rate of transmission will reduce the amplitude of the difference signals at the receiving end, resulting in a greater error rate in the presence of system noise. Thus, these simple one-coordinate type techniques are not suitable for transmission of high speed data in narrow channels.

When it is required to improve the detectability of the signal for a fixed transmission power, it is common to use a two-coordinate system. A commonly used technique utilizes orthogonal trigonometric coordinates to produce an 8-phase signal for transmission of 4800 bits per second over a nominal voice grade channel. These systems have a symbol rate of 1600 Hz to produce a 4800 bit rate or approximately 3 bits per Hz. In order to approximately center the spectrum of the transmitted signal, a carrier is generally chosen at about 1700 Hz. The signal set has an alphabet of 8 phases with each vector separated by 45°. The transmitted signal is the linear sums of the two orthogonal components of the 1700 Hz carrier. The starting phase of the carrier may change at the beginning of every baud, and, consequently, the receiver must track the carrier to determine which signal was transmitted. There is no correlation of the signal from baud to baud and the system is not optimized for spectral occupancy. A low pass filter may be utilized at the transmitting end to filter out the higher frequency components and the line itself will also limit the spectrum. These elements tend to introduce intersymbol cross-talk and distortion which reduces detectability. Therefore, the demodulator at the receiving end must first extract the carrier from the incoming signal, it must obtain baud synchronization, it must equalize as far as possible the intersymbol interference, and finally, must make the bit decisions. It is also common to utilize transmission time for sending preambles and the like to initiate synchronization. Although the 8-phase system is transmitting digital information, it is, in essence, an analog system and is not easily implemented with logic circuits or in LSI form.

To obtain improved performance of modems for transmission of binary signals over narrow band communication channels, a signal design is required that will more accurately concentrate the spectral components of the transmitted signal into the band limits of the channel. Such a signal would require less equalization and would have reduced intersymbol interference. Next, the signal design should be such that it could be implemented digitally at the transmitting end so as to be easily implemented by LSI circuit elements. Therefore, a modem utilizing such a signal design would be capable of much better performance over telephone lines for high bit rate transmission. In addition, such a modem would have application to satellite channels in which the transmission power is limited and in which an improvement of a relatively small amount can result in a highly reliable communication channel.

SUMMARY OF THE INVENTION

The present invention is a modem using an improved signal design having a larger number of signal coordinates than prior art modems. The signal has a better spectral concentration and the energy of the difference signals at the receiver is increased. Basically, the time duration of a symbol is increased over that of the 8-phase system (which will be used for comparison purposes) by a factor n. To keep the same bit rate, the number of independent signals or coordinates is increased over the extended time interval. Thus, the increasing of the time duration permits a better spectral concentration. The increased energy of the difference signals is achieved by the proper combination of the signals used as the basis of the increased coordinate system. As will be shown, the signals can be expressed as analog signals or they can be synthesized digitally with a staircase approximation of the analog signals. The analog signals can be generated with the use of special linear filters whose impulse responses approximate trigonometric pulses.

To illustrate how the spectral occupancy of a signal may be improved when using a multiple coordinate trigonometric coordinate system, consider the spectral occupancy of the single coordinate signal defined by $$f(t) = \pm \sin \frac{\pi t}{\tau}, 0 \leq t \leq \tau \qquad (1)$$

$$= 0 \text{ elsewhere;}$$

and compare with the spectral occupancy of a more complex multiple coordinate signal designated by $$g(t) = \pm \sin \frac{\pi t}{3\tau} \pm \sin \frac{2\pi t}{3\tau} \pm \sin \frac{3\pi t}{3\tau} ; 0 \leq t \leq 3\tau \qquad (2)$$

$$= 0 \text{ elsewhere.}$$

These two signals have the same nominal bandwidth and transmit information at the same rate, but the signal in equation 2, because of its longer time duration for the symbol, has a more concentrated spectral occupancy as can be seen by inspecting the magnitudes of the Fourier transform of the signals:

$$F^2(\omega) = \frac{4\left(\frac{\pi}{\tau}\right)^2}{\tau\left(\frac{\pi}{\tau^2} - \omega^2\right)} \cos^2\left(\frac{\tau\omega}{2}\right), \quad (3)$$

for the spectrum of equation (1); and $$G^2(\omega) = \frac{4}{3\tau}\left[\frac{\left(\frac{\pi}{3\tau}\right)^2}{\left(\left[\frac{\pi}{3\tau}\right]^2 - \omega^2\right)^2} + \right.$$

$$\frac{\left(\frac{\pi}{\tau}\right)^2}{\left(\left[\frac{\pi}{\tau}\right]^2 - \omega^2\right)^2} \cos^2\left(\frac{3\tau\omega}{2}\right) +$$

$$\left. \frac{4}{3\tau} \frac{\left(\frac{2\pi}{3\tau}\right)^2}{\left[\left(\frac{2\pi}{3\tau}\right)^2 - \omega^2\right]^2} \sin^2\left(\frac{3\tau\omega}{2}\right)\right]; \quad (5)$$

for the spectrum of equation (4). When the individually modulated terms are added and compared in FIG. 1, it may be noted the spectral energy is much more concentrated for the signal of equation (4) as compared to that for equation (3).

After establishing a suitable coordinate system, the alphabet of signals which will define the signals to be transmitted is defined as linear sums of these coordinates. Having selected in coordinates, the specific design of the system becomes an n-dimensional geometry problem. The design of the signals should be such that the minimum distance between any pair of signals is maximized since the decision efficiency of the receiver is a function of this distance. As will be shown, the signal design of the invention can be synthesized directly at band pass and it is not always necessary to utilize a carrier.

Although a wide variety of coordinates could be used, it has been found that there are some systems of coordinates or "basis signals" which best concentrate the spectral occupancy in a given band. It has further been found that the optimum basis signals are eigenfunctions or eigenvectors of certain matrices. The derivation of the basis signals of the present invention is given in the Appendix. The signal design of the present invention is adaptable to many different communication channel requirements and the value of n may be chosen appropriately. For use in a telephone line-type modem to achieve 3 or 4 bits per Hz, a value of n=4 is appropriate, wherein each of the basis signals will be multiplied by a selected coefficient after which the four basis signals are linearly summed. By permitting the coefficients to be either positive or negative, 64 different sets of coefficients can be produced which can therefore define 6 bits of information. A suitable and simple set of 64 coefficients may be expressed as $$\left.\begin{matrix} \pm a, \pm a, \pm a, \pm b, \\ \pm a, \pm a, \pm b, \pm a \\ \pm a, \pm b, \pm a, \pm a \\ \pm b, \pm a, \pm a, \pm a \end{matrix}\right\} \text{64 signals} \quad (6)$$

Values for a and b can be derived which will maximize the minimum difference between any pair of signals while maintaining unit average energy per coordinate by the following equations; assuming unit energy per coordinate:

$$3a^2 + b^2 = 4; \quad (7)$$

then $$D^2 = 4a^2 \quad (8)$$

$$= 2(b - a)^2$$

Solving equation 7 gives a value of a=0.6731 and b=1.625. The minimum energy difference is therefore $$D^2 = 4a^2 = 1.812 \quad (9)$$

To determine the improvement over an 8-phase, 2 coordinate system, the minimum energy of the difference signals in that system may be calculated. In 8-phase modulation, the vectors are separated by 45° and, when normalized to unit energy, each vector will have a length of $\sqrt{2}$. The minimum energy of the difference signals may then be expressed as $$D^2 = 2R^2(1 - \cos\phi) \quad (10)$$

$$= 1.172$$

where $R = \sqrt{2}$, $\phi = 45°$

Comparing this value to that of the minimum difference in the signal design of the present invention shows an improvement of about 1.9 dB coding gain over the 8-phase technique.

Various higher order signal systems have been investigated. The most favorable case is for n=20 which gives a coding gain of 2.97 dB over 8-phase. It is to be noted that the coding schemes considered here require each symbol to have constant energy. That is, the sums of the squares of the coordinate values is the same for every signal or code. Higher order codes will also permit 4 bits per Hz systems; however, the optimal designs do not permit equal energy signals.

To generate the signal in accordance with the invention, a read only memory (ROM) may be programmed with the 64 composite signals formed by the product of each set of a and b coefficients multiplied by the four basis signals and linearly summed. Assuming that the data stream to be transmitted is serial, a byte of 6 data bits is stored and input to the ROM. A counter, synchronized to the data rate, reads out the sequence of binary coded signals representing the successive digitized values of the composite waveform. A digital-to-analog converter converts the binary coded signal to an analog staircase approximation of the composite waveform representative of the 6-bit byte which is then transmitted over the transmission channel. At the receiving end, the baud rate is extracted from the incoming signal and the incoming signal fed in parallel to four correlation circuits formed by multipliers and integrators. Each of the four basis signals is generated locally at the receiver in binary coded form from a ROM driven by a 6-bit counter synchronized with the extracted baud rate. The four basis signals in parallel are each converted to analog form in a digital-to-analog converter. The four analog staircase waveforms each feed one of the multipliers in which the product of the respective analog basis signals with the incoming signal is produced, and thereafter integrated. Since the four basis signals are orthogonal, each locally generated basis signal will correlate only with the particular basis signal in the composite input signal. After multiplication and integration, an amplitude and polarity output is thus obtained, representative of the value and polarity of the coefficient of the correlating basis signal. The four signals from the correlation circuits split and feed separately a polarity decision decoder and a maximum amplitude selection circuit. The polarity decision decoder notes the polarity of each coefficient and the basis signal to which it applies. This decision will therefore define the initial 4-bits in the original transmitted byte. At the same time, the maximum amplitude circuit will determine which of the four coefficients is the largest, which will be the b coefficient, and along with the basis signal with which the b coefficient is associated, will define 2-bits of the transmitted signal byte. The output from the polarity decision decoder and the maximum signal decoder will thereafter be combined to produce the detected 6-bit byte.

Synchronization in the receiver may be derived by taking each of the correlator outputs, squaring to eliminate the polarity and summing the four squared signals. The sum signal is multiplied by an early-late gate generator output derived from the output of a voltage controlled oscillator (VCO). The output of the multiplier is then filtered and utilized to control the VCO which shifts the early-late gate so as to obtain zero output from the multiplier. At this time, the VCO output will be synchronized with the baud rate of the incoming signals and is used to control the receiver counter.

It is therefore a principal object of the invention to provide a method and apparatus for generating linear modulating signals which are accurately band limiting to concentrate the spectral components of a transmitted signal within the available channel bandwidth and to maximize the minimum energy of the difference between any pair of signals to decrease the error rate of detection in noise.

It is another object of the invention to provide a set of n coordinate basis signals which are mutually orthogonal, which can be amplitude modulated, and linearly summed to produce a highly detectable transmission signal.

It is yet another object of the invention to provide a modem for use on voice bandwidth communication channels having a capacity of 3 bits per Hz.

It is yet still another object of the invention to produce the above described signals implemented in digital format such that modulators and demodulators can be implemented using LSI circuits.

It is a further object of the invention to provide improved modems for producing signals having coding gain over prior art 3 bit per Hz modems.

It is still a further object of the invention to provide a 4800 bit per second modem having base band modulation which does not require carrier synchronization.

These and other objects and advantages of the invention will become apparent from the following detailed description and the drawings.

DETAILED DESCRIPTION OF THE PREFERRED EMBODIMENT

Figure 1:
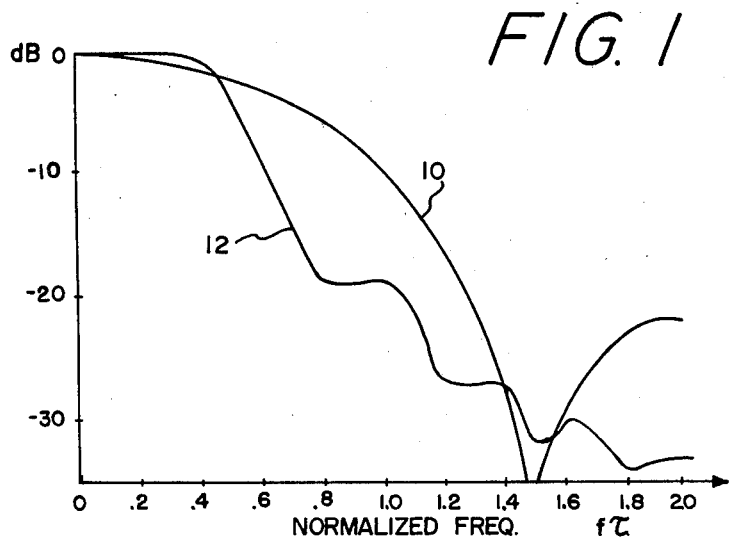
FIG. 1 is a plot of the spectral density of a prior art 8-phase modem signal compared to a multiple frequency trigonometric signal.
Figure 2:
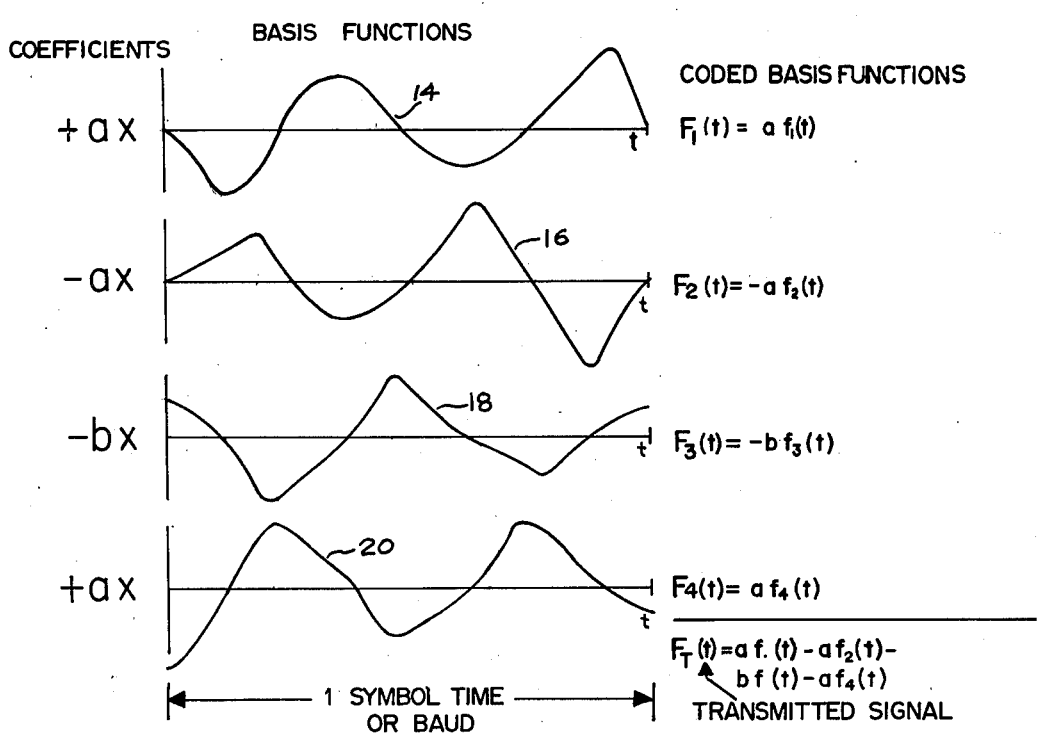
FIG. 2 is a graphical illustration of four mutually orthogonal basis signals weighted by a particular coefficient code set.
Figure 2A:
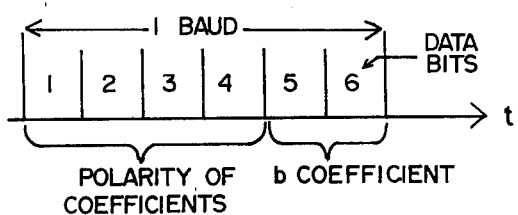
FIG. 2A is a diagram of a 6-bit byte of data indicating the coding scheme used in FIG. 2.

Referring to FIG. 2, a stylized representation of the four basis functions for one embodiment of the invention is shown as waveforms 14, 16, 18 and 20. It is to be understood that the specific wave shapes shown are not actual but are only to be used for explanatory purposes. A specific set of functions will be described hereinbelow. The four basis functions of FIG. 2 are assumed to be mutually orthogonal and to occupy a period of time equal to one symbol or baud. The time duration of the symbol is double that of the prior art 8-phase signals for the same bit rate. Therefore, doubling the number of orthogonal coordinates and doubling the time duration permits the same bit rate to be achieved. A group of 64 coefficients is formed from all of the combinations of the following coefficients: $\pm a$, $\pm a$, $\pm a$ and $\pm b$; where $a = 0.6731$ and $b = 1.625$. The example shown in FIG. 2 uses the sequence $+a$, $-a$, $-b$, and $+a$, which is one of the 64 combinations, to modulate the set of basis functions. Basis function 14 is indicated as being multiplied by coefficient $+a$ to give the first coded basis function $af_1(t)$. Similarly, basis function 16 is multiplied by $-a$ which gives the second coded basis function of $-af_2(t)$; the third basis function 18 being multiplied by $-b$ giving the third coded basis function of $-bf_3(t)$; and the fourth basis function 20 multiplied by $+a$ to give the fourth coded basis function $af_4(t)$. As may be now noted, a basis function after coding can have the phase as generated or be shifted 180° from the generated phase depending upon whether the multiplying coefficient has a plus or minus sign. With the four choices, the polarity sign defines four bits. For example, bits 1, 2, 3 and 4 in the one baud group of six bits indicated in FIG. 2a can be defined by the polarity. Since the three "a" coefficients have the same magnitude and the "b" coefficient has a greater magnitude, the selection of the basis function to be multiplied by "b" will have the highest absolute magnitude and can define the two bits 5 and 6 in FIG. 2a. As may now be recognized, the coded basis functions taken together represent a particular sequence of six digital bits. Therefore, the four coded basis functions are summed linearly as indicated by the sum $[af_1(t)-af_2(t)-bf_3(t)+af_4(t)]$ in FIG. 2 which is a complex analog waveform representative of one of the possible 64 digital sequences. The derivation of the basis functions as shown in the Appendix results in the frequency occupancy of the composite transmitted signal to be concentrated in the 700 to 2700 Hz band of a voice channel and the selection of the a and b coefficients have been made to maximize the difference signals which has been shown to provide a 1.9 dB improvement over 8-phase modulation. Thus, detectability at the receiver is significantly improved by the increase in energy due to greater spectral density and the coding gain due to the greater energy difference signals when compared to prior art 8-phase systems. As will be shown below, the implementation is simpler since the base band signal may be transmitted.

Since each of the components of the composite transmitted signal is orthogonal, each component can be recovered by correlating a stored version of that component basis function against the composite signal at the receiver. For illustration, assume that the basis function 18 stored in the receiver is correlated against the received reproduction of the transmitted signal shown in FIG. 2. Since basis functions 14, 16 and 20 are orthogonal to basis function 18, the correlator output will be for basis function 18 only and the contribution of the three other basis functions will be essentially zero. The correlation of basis function 18 against the composite signal will produce an output for its correlation with itself which will have a magnitude determined by the magnitude of the coefficient b and will have a polarity determined by the b coefficient polarity which, in this case, is negative. Similarly, each of the other three basis functions have their stored counterparts individually correlated against the received version of the transmitted signal and will each produce an output proportional to the magnitude of its coefficient. Therefore, an output representative of the magnitude of coefficient a will be obtained in each of the correlation channels for functions 14, 16 and 20. The polarity of the correlation output will again be that of the original coefficient and will, of course, be positive for the basis function 14 channel, negative for the basis function 16 channel, and positive for the basis function 20 channel. It will be recalled that the absolute magnitude of the b coefficient is greater than that of the a's, therefore the largest magnitude output will be in the basis function 18 correlator channel. The four correlator outputs may then be examined by the receiver, the four polarities noted to define the first four bits in the incoming baud, and the b coefficient identified by its magnitude associated with basis function 18 to define the remaining two bits in the baud. Logic circuits can then reassemble the 6 bit byte in the sequence transmitted.

Having now described the functioning of the four-coordinate signal structure of the invention, the manner of generating the transmitted signals will be described. A solution of the eigenvalue problem as described in the Appendix will produce a multiplicity of orthogonal waveforms from which those producing the most efficient signal can be selected. Using iterative techniques, it is possible to find the eigenvectors corresponding to the largest eigenvalues which will represent those most suitable for the invention. The results have been developed by computer for the 64 signals to be used with symbol rates of 600, 800 and 1200 per second as staircase approximations of the analog signals in the following Table I.

TABLE 1

STAIRCASE APPROXIMATIONS OF BASIS FUNCTIONS

| | $f_1(t)$ | $f_2(t)$ | $f_3(t)$ | $f_4(t)$ |
|---|---|---|---|---|
| 1. | −.033908 | −.0534695 | −.0454197 | −.163251 |
| 2. | −.0548576 | −.0214205 | −.0445436 | −.19923 |
| 3. | −.076143 | .0182534 | −.0378353 | −.227308 |
| 4. | −.0958603 | .0636901 | −.0248384 | −.244651 |
| 5. | −.111972 | .112408 | −.005644 | −.249076 |
| 6. | −.122477 | .161476 | .0190548 | −.239265 |
| 7. | −.125591 | .207723 | .0479597 | −.214912 |
| 8. | −.119928 | .247987 | .0792191 | −.176794 |
| 9. | −.104661 | .279366 | .110535 | −.126742 |
| 10. | −.079645 | .29946 | .139317 | −.0675344 |
| 11. | −.0454972 | .30657 | .162878 | −.002693 |
| 12. | −.003615 | .299858 | .178654 | .0637744 |
| 13. | .0438679 | .279422 | .184425 | .127693 |
| 14. | .0941899 | .246311 | .178527 | .185043 |
| 15. | .14413 | .202445 | .160037 | .232286 |
| 16. | .190221 | .150473 | .128903 | .266647 |
| 17. | .229002 | .0935677 | .0860088 | .286333 |
| 18. | .257279 | .0351685 | .0331784 | .290674 |
| 19. | .27238 | −.0212883 | −.0269059 | .280164 |
| 20. | .27239 | −.0726452 | −.0908524 | .256405 |
| 21. | .256326 | −.11627 | −.154773 | .221953 |
| 22. | .224263 | −.150257 | −.214545 | .180084 |
| 23. | .177371 | −.173563 | −.266104 | .134499 |
| 24. | .117882 | −.186062 | −.30574 | .0889913 |
| 25. | .0489664 | −.188529 | −.330385 | .0471168 |
| 26. | −.0254577 | −.182529 | −.337853 | .0118788 |
| 27. | −.10098 | −.170249 | −.327024 | −.0145261 |
| 28. | −.172994 | −.154269 | −.297957 | −.030889 |
| 29. | −.237018 | −.137303 | −.251913 | −.0370756 |
| 30. | −.289009 | −.12193 | −.191291 | −.0340138 |
| 31. | −.325646 | −.110343 | −.119477 | −.0235814 |
| 32. | −.344576 | −.104131 | −.0406262 | −.008406 |

As derived, the first two basis functions are even symmetric signals and the second two are odd symmetric signals. Therefore, only the upper half of each vector is listed. Each successive sample in the table represents a step increase or decrease in value of the waveform, dependent upon the sign of the value shown. If the 64 steps of each column from Table I were plotted, a set of four staircase approximations of a set of four analog basis functions would be obtained. Thus, the size of each step may be expressed as a binary coded number and easily stored in digital memory circuits for implementing both send and receive modems. When required, a digital-to-analog circuit can be used to generate the analog approximations.

Figure 9:
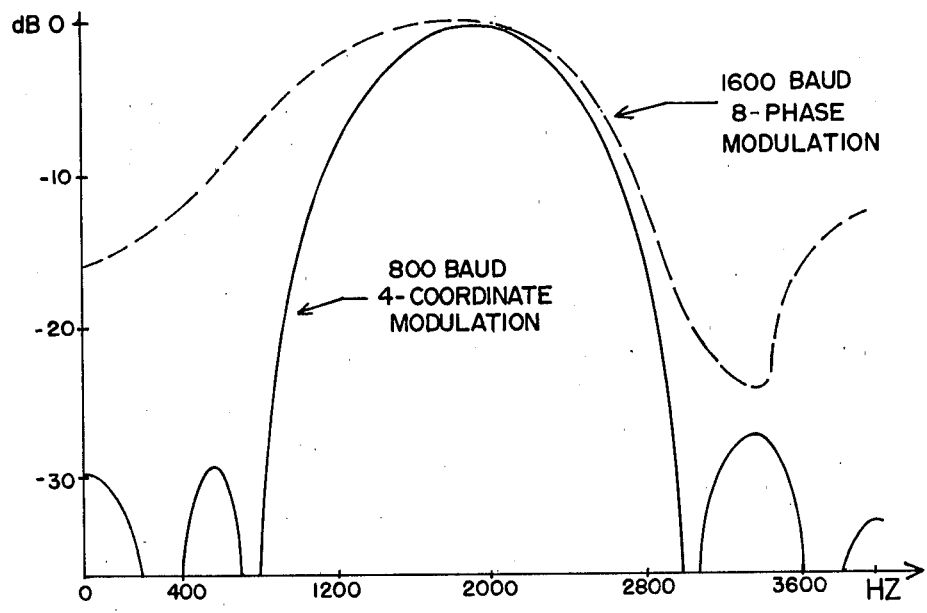
FIG. 9 is a spectral distribution plot for the 800 baud method and apparatus of the invention compared to prior art 1600 baud 8-phase method.

The sums of the spectral density for the set of signals of Table I has been calculated for various baud rates and the fraction of the total spectral energy in the desired 700 to 2700 Hz band has been determined. For the 600 baud case, 94.12% of the energy is in the desired band; for 800 baud, 92.27%; and for 1200 baud, 76.46% of the energy is in the desired band. In FIG. 9, the spectral density for the 800 baud rate is plotted. The spectral distribution of the two-coordinate 8-phase signal is also shown and the greater density of the signal of the invention is clearly noticeable.

Although the preferred embodiment of the invention produces approximately 3 bits per Hz with four coordinates or basis signals and produces a 1.9 dB coding gain over an 8-phase system, additional gain can be obtained by increasing the number of coordinates. A larger number of bits per symbol or baud would then be used. It is necessary to encode N bits per symbol where $$N = 2^{1.5n} \quad (11)$$

where n is the number of coordinates. Thus, N is 64 for a four-coordinate system as discussed above.

When n=6, 8, 10 or 12, a combination of two large b coefficients and the remainder of a coefficients may be used. The general design equations for a and b for unit energy per coordinate which will maximize the minimum difference signal are $$N = (n-2)a^2 + 2b^2 \quad (12)$$

$$4a^2 = 2(b-a)^2$$

The characteristics of systems for n=4, 6, 8, 10 and 12 are summarized in Table 2:

| No. of co-ordinates | Required No. of encoded bits, N | No. of signals available $C^n 2^{2n}$ | a | b | Coding gain over 8-phase |
|---|---|---|---|---|---|
| 4 | 64 | 64 | .6731 | 1.625 | 1.9 |
| 6 | 512 | 960 | .619 | 1.495 | 1.167 |
| 8 | 4,096 | 7,168 | .6731 | 1.625 | 1.895 |
| 10 | 32,768 | 46,080 | .7133 | 1.722 | 2.398 |
| 12 | 262,144 | 270,336 | .7444 | 1.797 | 2.769 |

Each of these coordinate systems have sufficient signals to encode N bits but only the n=10 and 12 systems produce a higher coding gain than the n=4 case. N=12 gives about 0.9 dB gain over n=4. As n is increased further, analysis indicates that the next favorable case is n=20 which produces a coding gain of 2.97 dB over the 8-phase system, but is only 0.2 dB better than n=12. Therefore, the extra hardware costs would usually not be justified.

The bit rate may be increased to 4 bits per Hz in accordance with the invention to produce systems showing gain over prior art modems achieving that bit rate. The prior art system used as a reference is the 8-phase modulation in which each vector is also amplitude modulation to either 0.8 or $\sqrt{2}$ of unit amplitude. For a peak energy per symbol constraint, the reference minimum difference signal is $$D_p^2 = (\sqrt{2} - 0.8)^2 = 0.37726 \quad (13)$$

The most practical coefficient signal design for a 4 bit per Hz modem in 6, 8 or 10 coordinates is $$(\pm b), (\pm b), (0), (0), \ldots (0); \quad \begin{matrix} \pm a & \pm a & +a \\ -a & -a & -a \end{matrix} \quad (14)$$

taking all permutations thereof.

To maximize the minimum energy difference for normalized peak energy per symbol, the following equations are used:

$$D^2 = a^2 = 2(b-a)^2 \quad (15)$$

$$N = 2b^2 + (n-2)a^2 \quad (16)$$

The system characteristics are as follows:

| No. of coordinates, n | Required No. of encoded bits, N | No. of signals available $4C^n 2^{3n-2}$ | $D^2 = a^2$ | Coding gain over reference |
|---|---|---|---|---|
| 6 | 4,096 | 4,860 | .6105 | 2.09 dB |
| 8 | 65,536 | 81,648 | .6763 | 2.535 dB |
| 10 | 1,048,576 | 1,180,980 | .7231 | 2.693 dB |

Thus, some improvement can be obtained by using more dimensions and more combinations of b coordinates. Three b coordinates and (n−3) a coordinates will encode 4 bits per Hz for n coordinates for n=6 to n=20. The n=20 case permits a 3.137 dB coding gain.

Figure 3:
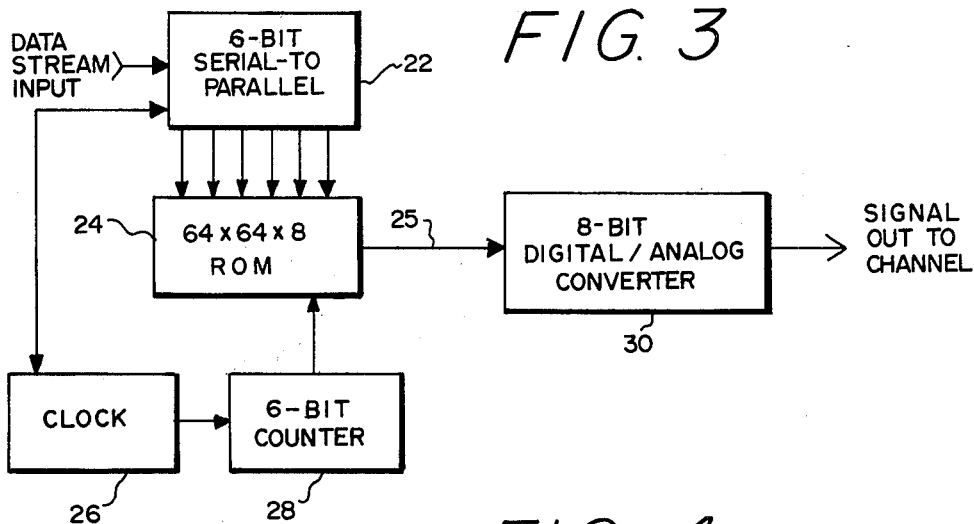
FIG. 3 is a simplified block diagram of a transmission modem in accordance with the invention in which the basis signals are binary coded.

Turning now to FIG. 3, a preferred implementation for the transmitting modem for the n=4, N=64 case is shown in block diagram form. The data bit stream input to 6 bit serial-to-parallel converter 22 is stored and assembled into 6 bit bytes which are read in parallel into ROM 24 at the baud rate. Clock 26, which may be derived from the data input stream, operates at the system bit rate. However, as is well known in the art, data storage devices may also be used and it is not necessary for the input bit rate and the output bit rate to be the same. ROM 24 is programmed to contain the 64 coded basis functions linearly summed where each function is stored as a 64 step staircase approximation of the analog basis function. 6 bit counter 28 reads out the selected waveform from ROM 24 at the baud rate. Each step of the 64 steps of the output waveform on lead 25 is expressed as a binary number and therefore the output on lead 25 is a sequence of 64 digital numbers. 8 bit digital-to-analog converter 30 converts the digital bit stream to the analog staircase approximation of the complex waveform to be transmitted which will therefore be a staircase representation of the transmitted signal as shown in the summation of FIG. 2. Although not shown, it is to be understood that the transmitted signal may be processed through a low pass filter or the like to minimize noise.

Figure 4:
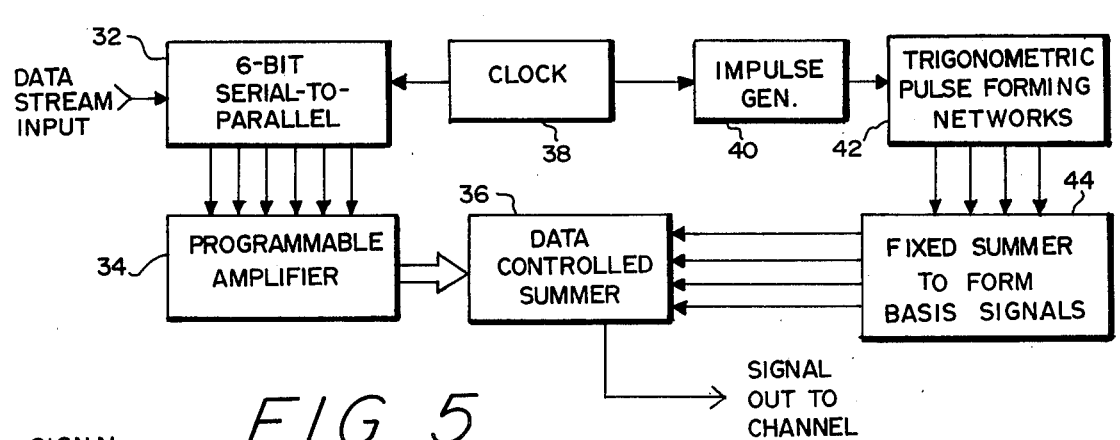
FIG. 4 is a simplified block diagram of a transmission modem in accordance with the invention in which the basis signals are in analog form.

As may be noted, the major elements of the transmitting modem of FIG. 3 are digital in nature and therefore well adapted to implementation by means of LSI circuits. Thus, very compact and reliable modems can be constructed using this technique. However, the invention can also be implemented by the use of analog signals. FIG. 4 is a block diagram of an analog implementation. The four basis signals are here generated by driving trigonometric pulse forming networks with impulses. Clock 38 drives impulse generator 40 to produce a sequence of impulses at the baud rate which drives the pulse forming networks 42. A set of four basis signals is then produced in summer 44 and fed to data control summer 36. Details of trigonometric pulse forming networks 42 may be found in the paper, *Trigonometric Pulse Forming Networks Revisited* by Peter H. Halpern, IEEE Transactions On Circuit Theory, January, 1972 which is incorporated herein by reference. The data stream input is fed to 6 bit serial-to-parallel converter 32 and the incoming data bits are arranged in 6 bit bytes which are transferred to programmable amplifier 34 at the baud rate. Programmable amplifier 34 is programmed to select the four coefficients and their polarities and to control data summer 36 so as to multiply each of the four analog basis signals by the selected coefficients and to sum the weighted signals for transmission over the channel.

Figure 5:
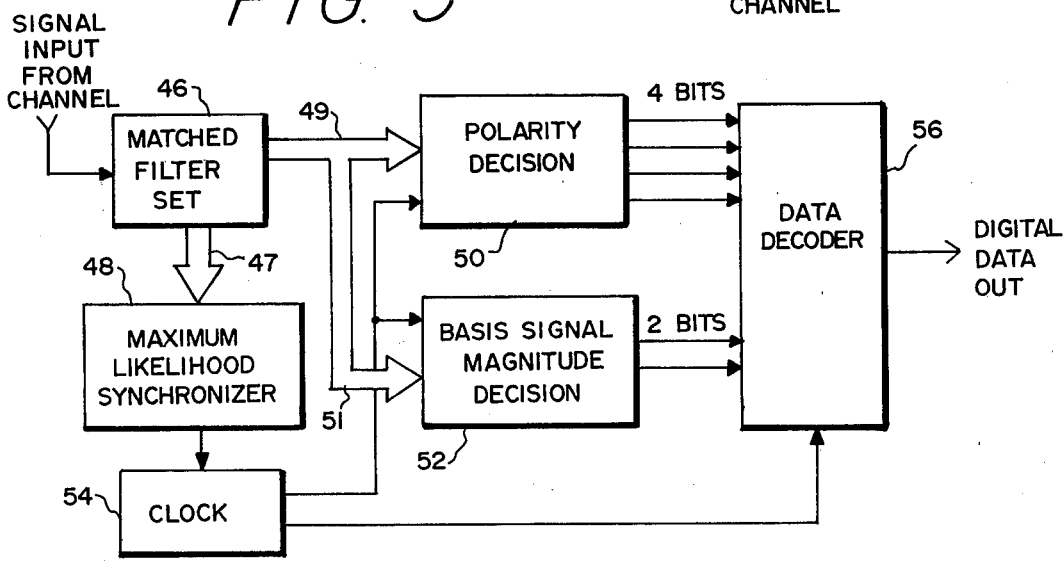
FIG. 5 is a simplified block diagram of a receiving modem of the invention.

The receiver for the modem is shown in functional block diagram form in FIG. 5. The received signal is fed to a set of matched filters 46 whose output is connected via bus 49 to polarity decision circuits 50 and via bus 51 to the basis signal magnitude decision circuits 52. The output of matched filter set 46 also feeds a maximum likelihood synchronizer 48 via bus 47. Synchronizer 48 will extract the baud rate in a base band system or, if a carrier system is used, will extract both the baud rate and the carrier signal. Synchronizer 48 will control clock 54 to provide receiver modem timing. In polarity decision 50, the sequence of positive and negative coefficients of the correlation function for each of the four basis signals is determined which defines the first 4 bits in the baud or symbol byte. Simultaneously, the magnitude decision circuits 52 compare the four correlation functions and select the function having the greatest magnitude which, of course, represents the basis function having the b coefficient. As previously mentioned, this decision will define the last two bits of the data byte. Data decoder 56 recombines the four bits from the polarity decision circuits 50 and the two bits from the magnitude decision circuits 52 to produce the received decision of the transmitted 6 bit data byte.

Figure 6:
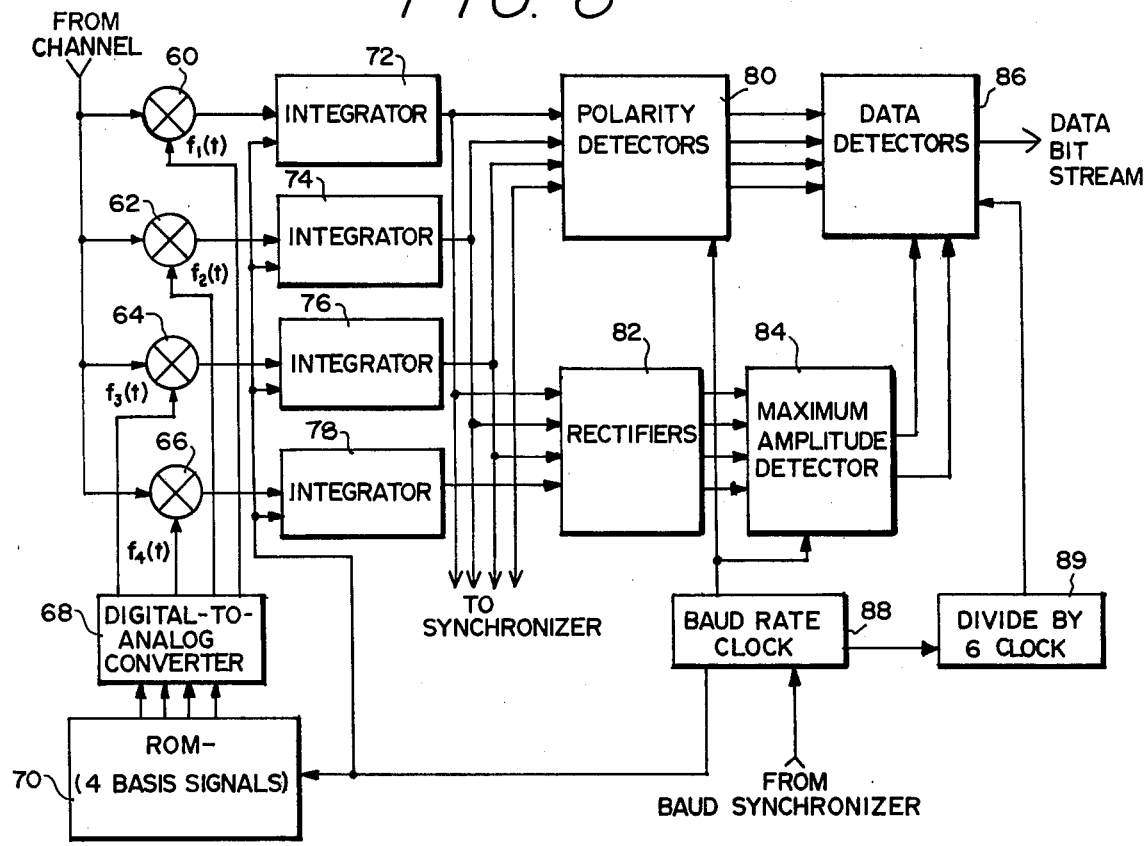
FIG. 6 is a specific implementation block diagram of the unit of FIG. 5.

Having now shown functionally a typical modem receiver, FIG. 6 illustrates a preferred implementation of the receiver modem. The set of matched filters 46 of FIG. 5 is implemented by means of a set of four multipliers 60, 62, 64, and 66 followed by a set of four integrators 72, 74, 76, and 78. A ROM 70 has the four basis signals stored with each being a 64 step staircase representation of the basis function and is identical to the representation used in the transmitting modem previously discussed. The four basis signals, expressed in ROM 70 in digitally coded form, are read out in parallel to digital-to-analog converter 68. The outputs from digital-to-analog converter 68 are the four analog staircase representations of the basis functions with each representing an input to its respective multiplier. For example, multiplier 60 receives basis signal $f_1(t)$, multiplier 62 receives basis signal $f_2(t)$ and so on. Assuming that the output of D/A converter 68 is in baud synchronization with the incoming sequence of composite signals, it may be seen that basis signal $f_1(t)$ is multiplied by the composite waveform in multiplier 60. Due to the orthogonality of the four basis signals making up the input waveform, only the product of $f_1(t)$ and the $f_1(t)$ component of the incoming waveform will produce an output. Integrator 72 averages this output over the baud period thereby producing an output whose amplitude represents the degree of correlation between $f_1(t)$ and the incoming waveform. The values and polarities of the signals in the integrators are sampled at the end of a baud by means of a sampling pulse from baud rate clock 88, transferred to polarity detectors 80 and rectifiers 82, and the integrators dumped. The polarity of the incoming basis signal $f_1(t)$ with the locally generated $f_1(t)$ is maintained such that polarity detectors 80 can note the polarity of the received $f_1(t)$ as well as that of the other three received basis functions. Polarity detectors 80 note the sequence of polarities and generate the 4 bits represented by that sequence in parallel which are fed to data decoder 86. Simultaneously, with the polarity detection, the integrator outputs are fed to a set of rectifiers 82 which produce magnitude signals from the four integrator outputs without regard to polarity. Maximum amplitude detector 84 determines the channel having the greatest amplitude which will denote the basis function having the b coefficient. For example, if the particular code indicated in FIG. 2 had been received, then $f_3(t)$ would be found to have the greatest amplitude. Once this detection is accomplished, the final 2 bits of the data byte is encoded in parallel and input to data decoder 86. As indicated in FIG. 6, the outputs of the integrators also feed the maximum likelihood synchronizer as will be described below. Assuming a base band system, synchronizing signals from the synchronizer will control baud rate clock 88 which controls the transfer of data from polarity detectors 80 and amplitude detector 84 to data decoder 86. Clock 88 may be counted down by bit rate clock 89 which times data decoder 86 to read out the six detected bits at the proper bit rate. Baud rate clock 88 also controls ROM 70 to read out the four stored basis signals at the beginning of each incoming baud.

Figure 7:
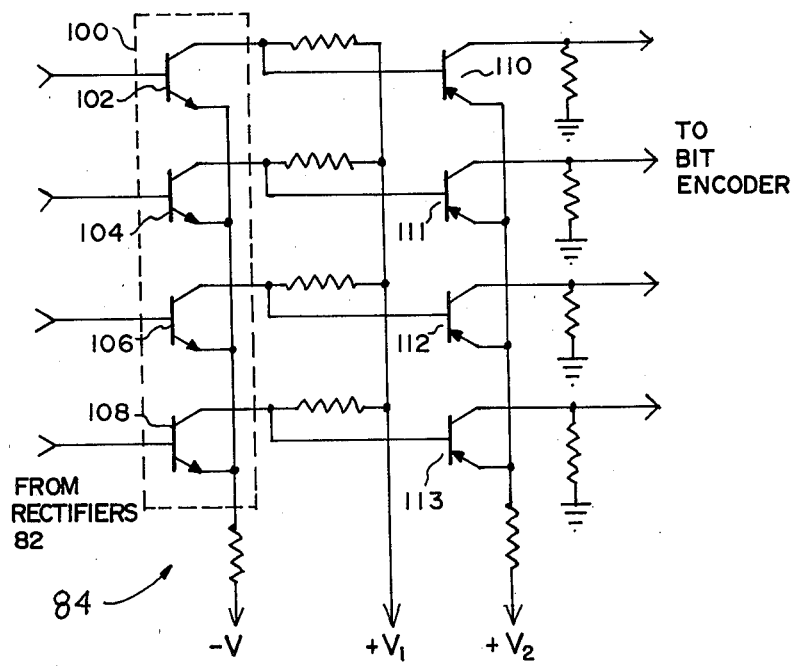
FIG. 7 is a circuit of the maximum amplitude detector of FIG. 6.

Maximum amplitude detector 84 may use a novel and simple n-way comparison circuit to select the maximum amplitude input signal. A four way comparison as required in the exemplary system is shown in FIG. 7 in which a set of four matched transistors 100 comprising transistors 102, 104, 106, and 108 is used. It is preferable that the emitter base diodes be fabricated on the same chip to insure close matching. The four inputs to the bases of transistors 100 will in general consist of three signals having almost the same amplitudes representative of the a coefficients and one signal having a much greater amplitude, representative of the b coefficient. The majority of the current flowing will occur in the transistor having the largest signal on its base. Therefore, the maximum voltage will occur across the collector resistor of that transistor and will be further amplified by the corresponding transistor 110, 111, 112 or 113. Advantageously, the circuit of FIG. 7 can produce a very precise output even under low signal-to-noise conditions.

Figure 8:
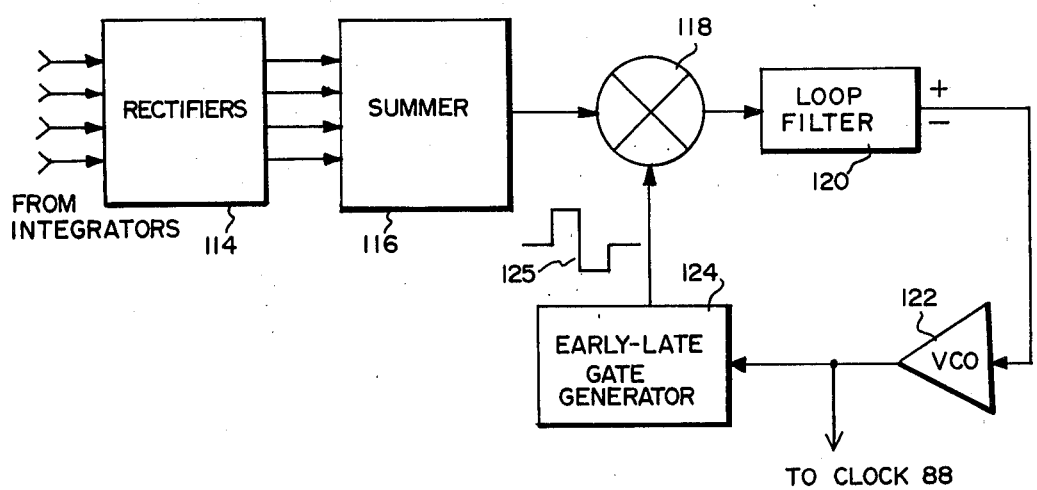
FIG. 8 is a maximum likelihood synchronizer block diagram for the circuit of FIG. 6.

Turning now to FIG. 8, a block diagram of the baud synchronization circuit is shown. The outputs from the integrators of FIG. 7, which are either plus or minus voltage levels, are squared by rectifiers 114 to produce four magnitude signals. These four magnitude signals are summed in summer 116 and the total signal used to drive multiplier 118. The signals from the integrators to rectifiers 114 occur at the sampling time at the end of a band. VCO 122 generates a clock signal at approximately the baud rate. This signal controls early-late gate generator 124 which outputs waveform 125. Thus, the summed integrator output is multiplied by waveform 125 and the output is filtered by loop filter 120 which produces a plus or minus dc voltage output dependent upon whether the output of summer 116 is occuring early or late with respect to the end of the baud. The loop filter output polarity will be set to shift VCO 122 in the direction to move the output of summer 116 into coincidence with waveform 125 which, because of its positive and negative going portions, will result in zero output from loop filter 120 when exactly centered on the summer output voltage.

In FIG. 9, the spectral distribution for the invention utilizing an 800 symbol per second rate is shown. The concentration of the energy in the nominal 700 to 2700 Hz band typical of voice grade circuits is easily seen. The system is easily adaptable to higher and lower symbol rates with the lower rate, for example 600 symbols per second, producing a more concentrated spectrum while a higher rate, such as 1200 symbols per second, producing a broader spectrum. With the coefficient matrix shown, approximately 3 bits per Hz modems can be realized, and a 7200 bit per second modem having much better performance than the prior art two coordinate system modem can be implemented. As previously mentioned, higher data rates can be obtained by increasing the number of coordinates; however, the complexity of the transmitting and receiving modems increases. A 4 bit per Hz signal can be obtained with four basis signals and an additional b coefficient, with only a moderate increase in equipment complexity.

As may now be recognized, a new and efficient method and modem for transmission of digital data over band limited channels has been disclosed. The transmitting and receiving portions of the modem store a set of mutually orthogonal basis signals selected to maximize their energies in the channel bandwidth to form a composite carrier signal when weighted and summed. The weighting utilizes a set of optimized coefficients to provide coding of bytes of digital data, with the coefficients selected to maximize the minimum energy difference between pairs of coefficients. The coefficients are recovered at the receiver by correlation. Both coding gain and reduction of intersymbol interference is achieved.

Although specific values of basis signals and coefficients have been presented for exemplary purposes, and particular modem implementations have been described, those of skill in the art may select other signals and coefficients, numbers of orthogonal basis signals, such alternatives are considered to fall within the spirit and scope of the invention. The disclosed modem may be implemented by other well known devices which provide the same functions and are therefore encompassed within the present invention.

APPENDIX

Let $F(\omega)$ be the Fourier transform of an individual coordinate. It is required to concentrate the energy in a given frequency band having a lower frequency $\omega_L$ and an upper frequency $\omega_u$. The quantity to be maximized is $$J = \frac{1}{\pi} \int_{\omega_L}^{\omega_u} F(\omega)F^*(\omega)d\omega. \tag{17}$$

Converting equation (1) into the time domain:

$$J = \frac{1}{2\pi} \int_{\omega_L}^{\omega_u} \int_{-\omega_u}^{-\omega_L} \left[ \int\int_{-\frac{\tau}{2}}^{+\frac{\tau}{2}} f(t)f(\chi)e^{-\delta e^{\omega\chi + j\omega t}} dt d\chi \right] d\omega \tag{18}$$

Interchanging the order of integration:

$$J = \int\int_{-\frac{\tau}{2}}^{+\frac{\tau}{2}} f(\chi)f(t) \left( \frac{\sin\omega_u(t - \chi) - \sin\omega_L(t - \chi)}{\pi(t - \chi)} \right) dt d\chi \tag{19}$$

here the duration of the signal $f(t)$ is from $-\tau/2 + \tau/2$.

Normalizing $f(t)$ to maximize J of equation (19), the kernal of the integrand of equation (19) is $$G(t - \chi) = \frac{\sin\omega_u(t - \chi) - \sin\omega_L(t - \chi)}{\pi(t - \chi)} \tag{20}$$

Which specializes to the low pass case for $\omega_L = 0$;

$$G(t - \chi) = \frac{\sin\omega_u(t - \chi)}{\pi(t - \chi)} \tag{21}$$

The general form of the kernal for a modulated carrier may be expressed as $$G(t - \chi) = \frac{\cos\omega_0(t - \chi)[\sin\omega_u(t - \chi) - \sin\omega_L(t - \chi)]}{\pi(t - \chi)} \tag{22}$$

For the case where the signal $f(t)$ is digitally synthesized as staircase waveforms, it is expressed as $$F(t) = \sum_{1}^{n} a_k U_k(t); \tag{23}$$

Where $U_k = 1$; $-\frac{\tau}{2} + \frac{(k-1)\tau}{n} \leq t \leq -\frac{\tau}{2} + \frac{k\tau}{n}$ $= 0$ elsewhere.

The quantity J of equation (19) becomes an ordinary quadratic form $$J = a^{30} Ga \tag{24}$$

where a is a column vector whose entries are the $a_k$'s of equation (23)

For the analog case, $f(t)$ is expanded in the trigonometric series $$f(t) = \Sigma a_k \frac{\sin k\tau \left(t - \frac{\tau}{2}\right)}{\tau}; \quad |t| \leq \frac{\tau}{2} \tag{25}$$

$= 0$ elsewhere.

The entries to the matrix G of equation (24) in the digital case are $$g_{ij} = \int\int_{-\frac{\tau}{2}}^{+\frac{\tau}{2}} G(t - \chi)\eta_i(t)U_j(\chi)d\chi \tag{26}$$

and in the analog case are $$g_{ij} = \iint_{-\frac{T}{2}}^{+\frac{T}{2}} G(t - \chi) \frac{\sin i\pi\left(t - \frac{T}{2}\right)}{T} \frac{\sin j\pi\left(\chi - \frac{T}{2}\right)}{T} dt d\chi \tag{27}$$

Applying standard matrix theory, the signals which maximize the desired spectral occupancy are solutions of the matrix eigenvalue problem $$Ga = \lambda a. \tag{28}$$

For an n coordinate system, the first n eigenvectors corresponding to the largest eigenvalues of equation (28) are selected.

The matrix G can be partitioned into the form $$G = \left(\begin{array}{c|c} X & Y \\ \hline Y & X \end{array}\right), \tag{29}$$

and, because it is Toplitz, the two smaller matrices $$A = X + \overline{Y}, \; B = X - \overline{Y} \tag{30}$$

to obtain the even and odd symmetric eigenvectors. $\overline{Y}$ is the same as Y with its columns reversed. Using iterative techniques, the eigenvectors corresponding to the largest eigenvalues for A and B in equations (30) are derived. After the first and largest eigenvector is obtained, the iterative process takes out the component of the largest and develops the next larger eigenvector. The process is repeated until n eigenvectors are obtained. The entries in those eigenvectors describe the optimum basis functions according to either equation (23) for the digital case or equation (25) for the analog case.

We claim:

1. The method of transferring digital data over a bandwidth limited channel comprising the steps of:
generating, at the transmitting end of the channel, a set of n mutually orthogonal equal length basis signals in which the energy of each of the basis signals within such limited bandwidth is maximized and the length of the set represents a baud;
storing the n basis signals in a selected order;
generating a set of n coefficients in which the minimum difference energy between any pair of coefficients is maximized;
storing a set of $2^{1.5n}$ code combinations of the n coefficients;
designating a different one of said code combinations for each different one of the possible combinations of 1.5n bits;
assembling successive bytes of 1.5n bits of digital data to be transmitted;
selecting the designated code combination for each successive digital data byte;
weighting the respective n stored basis signals of the set by the code combination for each successive byte;
summing the n weighted basis signals for each byte to form successive composite signals representative of the successive data bytes; and
transmitting the successive composite signals over the bandwidth limited channel at a selected baud rate.

2. The method of claim 1 comprising the further steps of:
receiving, at the receiving end of the channel, the successive composite signals;
extracting a baud rate signal from the composite signals;
synchronizing a clock to the extracted baud rate signal;
generating a data bit rate by dividing the clock output by n;
locally generating the n basis signals separately and in parallel during each successive baud;
correlating the received successive bauds of the composite signal with each of the generated n basis signals in parallel to produce a coefficient signal for each basis signal;
identifying the polarity of each coefficient signal;
determining the amplitude of each coefficient signal;
determining the received code combination of the coefficients from the polarities and amplitudes of the coefficients; and
reproducing the combination of 1.5n bits represented by each successively determined code combination.

3. The method of claim 2 in which the step of locally generating n mutually orthogonal basis signals includes the step of generating a staircase waveform representation of each generated basis signal, and in which the step of storing the n basis signals includes the step of converting the staircase waveform to binary codes representative of the amplitude of each staircase step and storing the binary digital codes in a read only memory.

4. The method of claim 3 in which the step of locally generating the n basis signals includes the step of storing the binary coded staircase waveform representation of the n basis signals in a read only memory and reading out the n binary coded basis signals in parallel during each baud.

5. The method of claim 4 in which the step of correlating includes the steps of:
converting the n read-out binary coded basis signals to n analog waveforms;
multiplying the composite signal during each baud separately and simultaneously by each of the n analog waveforms; and
integrating over each baud the n products of such multiplication to produce the coefficient for each of the n basis signals.

6. The method of claim 2 which includes the further steps of:
selecting n equal to four whereby $2^{1.5n}$ is equal to 64;
selecting the four mutually orthogonal basis signals as the first four eigenvectors corresponding to the largest eigenvalues found from the solution of the matrix eigenvalue problem $Ga = \lambda a$ for a bandwidth having a lower frequency limit of 700 Hz and an upper frequency limit of 2700 Hz;
selecting the set of coefficients to have the form $\pm 0.6371$, $\pm 0.6371$, $\pm 0.6371$ and $\pm 1.625$; and
transmitting the successive composite signals over a channel having a nominal bandwidth of 700 Hz to 2700 Hz.

7. The method of claim 6 in which the step of transmitting the successive composite signals is performed at a baud rate of 800 per second.

8. The method of claim 6 in which the step of transmitting the successive composite signals is performed at a baud rate of 1200 per second.

9. Apparatus for transmitting digital data over a bandwidth limited channel comprising:

means for generating a set of n mutually orthogonal basis signals;

means for generating $2^{1.5n}$ sets of n coefficients;

weighting means for weighting the set of n basis signals by each of said $2^{1.5n}$ sets of coefficients;

summing means for producing a sum of the $2^{1.5n}$ weighted sets of said n basis signals;

storage means for storing the $2^{1.5n}$ sums of said weighted basis signals;

clock means for generating a baud rate clock signal;

serial-to-parallel conversion means for receiving a digital data bit stream to be transmitted and for converting successive bytes of 1.5n serial bits of said bit stream to parallel form, said conversion means connected to said clock means and responsive to said baud rate clock signal for outputting said 1.5n bits in parallel to said storage means;

coding means connected to said storage means, said clock means and said conversion means, said coding means for selecting a code signal formed by one of said sums of $2^{1.5n}$ weighted signals for each successive baud, each selected code signal representative of a 1.5n bit byte during a baud thereby producing a sequence of composite signals; and transmission means connected to said storage means and said coding means for transmitting said sequence of composite signals over said channel.

10. The apparatus as defined in claim 9 in which:

said storage means is a read only memory for storing said sums of $2^{1.5n}$ weighted basis signals expressed as n staircase waveform representations of said basis signals weighted by said sets of coefficients, said sums thereby expressed as a set of binary coded signals;

said clock means includes a bit rate clock synchronized to the bit rate of said digital data bit stream and a divide-by-n counter for generating said baud rate clock signal, said baud rate clock signal connected to said read only memory; and said transmission means includes digital-to-analog converter means connected to said read only memory for receiving each successive binary coded signal responsive to said baud rate clock signals for converting said successive binary coded signals to said sequence of composite signals.

11. Apparatus for transfer of digital data over a bandwidth limited channel comprising:

clock means for generating a baud rate clock;

impulse generator connected to said clock means for generating an impulse function for each successive baud;

pulse forming network driven by said impulse generator for producing a set of n mutually orthogonal trigonometric signals;

fixed summer means for receiving said n trigonometric signals for producing n basis signals;

serial-to-parallel conversion means receiving a serial digital bit stream input, said conversion means for converting successive 1.5n bit bytes of said bit stream to parallel form, said conversion means connected to said clock means, and responsive to said baud rate clock signal;

programmable amplifier means having n coefficients stored therein in $2^{1.5n}$ sets thereof, said amplifier means connected to said serial-to-parallel conversion means to receive each byte of 1.5n parallel bits responsive to said baud rate clock signal, said amplifier means for coding each successive 1.5n bit bytes by one of said $2^{1.5n}$ sets of said coefficients; and data controlled summer means connected to said fixed summer means and to said programmable amplifier means for weighting each of said n basis signals by one of said stored n coefficients and for summing said n weighted basis signals to form a composite analog signal for transmission over said channel.

12. The apparatus as defined in claim 9 or 11 which further comprises:

input means connected to said channel for receiving a sequence of said composite signals;

synchronizing means connected to said input means for extracting a baud synchronization clock signal from said sequence of composite signal;

a set of n matched filters having inputs thereof connected together in parallel and connected to said input means wherein each filter of said set is matched to a different one of said n basis signals, said filters producing a set of n filter output signals representative of the one of said $2^{1.5n}$ sets of coefficients used to weight each successive sum for each baud;

polarity and magnitude detection means connected to receive one of said sets of filter output signals in response to each baud clock signal for determining the polarities of each of said n coefficients of such one set and the relative magnitudes among said n coefficients thereof; and data decoder means connected to said polarity and magnitude detection means for determining the 1.5n bits in each baud represented by the polarities and magnitudes of said sets of n filter output signals thereby reproducing the digital data bit stream input.

13. The apparatus as defined in claim 11 in which:

said pulse forming network produces four mutually orthogonal trigonometric signals;

said fixed summer means produces four basis signals;

said bytes consist of six serial bits; and said programmable amplifier means stores a set of four coefficients in the form of 64 unique combinations thereof.

14. The apparatus as defined in claim 13 in which said four mutually orthogonal basis signals are selected as the first four eigenvectors corresponding to the largest eigenvalues found from the solution of the matrix eigenvalue problem $Ga = \lambda a$ for a bandwidth having a lower frequency limit of 700 Hz and an upper frequency limit of 2700 Hz, and in which said set of four coefficients is selected to have the form $\pm 0.6371$, $\pm 0.6371$, $\pm 0.6371$ and $\pm 1.625$.

15. The apparatus of claim 12 in which said set of n matched filters comprises:

a set of n multipliers, each having a first input connected to said input means, a second input, and an output;

a basis signal read only memory for storing said n basis signals, said memory having n outputs, each one of said outputs connected to one of a said second input of said n multipliers; and a set of n integrators, each one of said integrators connected to the output of one of said n multipliers.

16. A modem for operation over a voice channel having a usable bandwidth of 700 Hz to 2700 Hz, said modem having a transmission capacity of 3 bits per Hz comprising:

a 6-bit serial-to-parallel converter for receiving a serial digital data bit stream for storing 6 bit bytes and for reading out the bits of each successive stored byte in parallel;

a clock for deriving clock signals from said serial bit stream, said clock having a 6 bit counter for generating a rate signal defining a baud;

a 64×64×8 read only memory having binary coded representations of 64 weighted basis signals stored therein, said read only memory including means for forming said weighted basis signals from four mutually orthogonal basis signals selected to maximize the spectral energy thereof within said 700 Hz to 2700 Hz bandwidth weighted by 64 unique sets of four coefficients selected to maximize the minimum difference energy between any pair of coefficients wherein three of said coefficients have equal amplitude and the other one of said coefficients has a higher amplitude, each set of the four weighted basis signals being summed to form a set of 64 combined signals, each of said combined signals stored in said read only memory as binary coded staircase waveform representations thereof, said read only memory including coding means connected to said serial-to-parallel converter for receiving successive ones of said 6-bit bytes in parallel and for coding each different byte as a unique one of said 64 combined signals, each successive binary coded byte being read out of said read only memory by said clock signals during each successive baud period defined by said clock; and digital-to-analog converter means for receiving each successive binary coded byte and converting same to an analog composite signal for transmission over said voice channel.

17. The apparatus as defined in claim 16 in which said modem further comprises:

an input from said voice channel;

a set of four multipliers having a first input from each connected to said input for receiving a transmitted analog composite signal, a second input for a multiplying signal, and an output;

a receiving read only memory for storing a binary coded representation of each of said four basis signals, said receiving memory having an output for each of said basis signals;

four digital-to-analog converters connected to said receiving read only memory for receiving said four binary coded basis signals in parallel therefrom, each of said converters producing an analog waveform representation of one of said basis signals on its output, the outputs from said converters connected respectively to said second inputs of said multipliers whereby a received analog composite signal is multiplied by each of said four basis signals;

a set of four integrators, each of said integrators having an input connected to the output of a corresponding multiplier, the output signals from said integrator defining the set of coefficients of the received analog composite signal for each successive baud;

synchronizer means connected to the outputs of said integrators for generating synchronization pulses at the baud rate of said composite signals;

baud rate clock synchronized by said synchronizer means, said clock connected to said receiving memory for clocking out said basis signals during each successive baud period and to said integrator for dumping thereof;

polarity detectors for receiving said coefficient output signals from said integrators for identifying the polarity of each of the four coefficients defined by said coefficient outputs;

maximum amplitude detector means for receiving said coefficient output signals from said integrators for determining the coefficient defined by said coefficient outputs having the highest amplitude; and data decoder connected to said polarity detectors and said maximum amplitude detector for generating 4 bits of each 6 bit data byte defined by said identified coefficient polarities and 2 bits of each 6-bit data byte defined by said highest amplitude coefficient, said data decoder thereby outputting a sequence of said 6-bit bytes.

* * * * *